United States Patent [19]

Richardson

[11] Patent Number: 5,105,780
[45] Date of Patent: Apr. 21, 1992

[54] IGNITION ASSISTING DEVICE FOR INTERNAL COMBUSTION ENGINES

[75] Inventor: Ronald D. Richardson, Pekin, Ill.

[73] Assignee: Caterpillar Inc., Peoria, Ill.

[21] Appl. No.: 564,278

[22] Filed: Aug. 8, 1990

[51] Int. Cl.⁵ ............................................. F02B 19/08
[52] U.S. Cl. .............................. 123/263; 123/169 PA; 123/266; 123/285; 123/293; 313/143
[58] Field of Search ............. 123/143 B, 169 PA, 260, 123/262, 263, 266, 267, 293, 285; 313/143

[56] References Cited

U.S. PATENT DOCUMENTS

| | | | |
|---|---|---|---|
| 1,392,364 | 10/1921 | Smith | 123/285 |
| 1,511,739 | 5/1923 | McDowell | 123/169 PA |
| 2,100,320 | 11/1937 | Browning | 123/266 |
| 2,127,512 | 8/1938 | Harper, Jr. | 123/169 PA |
| 2,153,598 | 4/1939 | Steward | 123/169 V |
| 2,826,187 | 3/1958 | Meyer | 123/259 |
| 2,895,069 | 7/1959 | Davis | 313/143 |
| 3,076,912 | 2/1963 | Novak et al. | 313/143 |
| 4,174,679 | 11/1979 | Noguchi et al. | 123/263 |
| 4,175,531 | 11/1979 | Tanahashi | 123/260 |
| 4,175,533 | 11/1979 | Goto et al. | 123/260 |
| 4,182,279 | 1/1980 | Sato et al. | 123/293 |
| 4,198,944 | 4/1980 | Heintzelman | 123/169 R |
| 4,218,992 | 8/1980 | Latsch et al. | 123/263 |
| 4,305,357 | 12/1981 | Scherenberg et al. | 123/254 |
| 4,327,681 | 5/1982 | Latsch et al. | 123/260 |
| 4,332,224 | 6/1982 | Latsch et al. | 123/254 |
| 4,361,122 | 11/1982 | Latsch | 123/266 |
| 4,416,228 | 11/1988 | Benedikt et al. | 123/268 |
| 4,442,807 | 4/1984 | Latsch et al. | 123/263 |
| 4,452,189 | 6/1984 | Latsch et al. | 123/143 B |
| 4,499,399 | 2/1985 | Flores | 123/266 |
| 4,509,476 | 4/1985 | Breuser et al. | 123/266 |
| 4,513,708 | 4/1985 | Latsch et al. | 123/263 |
| 4,715,337 | 12/1987 | Bohl et al. | 123/169 PA |
| 4,987,868 | 1/1991 | Richardson | 123/266 |

FOREIGN PATENT DOCUMENTS

| | | |
|---|---|---|
| C640226 | 4/1937 | Fed. Rep. of Germany . |
| C661768 | 6/1938 | Fed. Rep. of Germany . |
| C661769 | 6/1938 | Fed. Rep. of Germany . |
| 2436698 | 7/1974 | Fed. Rep. of Germany ...... 123/260 |
| 2524453 | 6/1975 | Fed. Rep. of Germany ...... 123/266 |
| 3300945A1 | 7/1984 | Fed. Rep. of Germany . |
| 261413 | 6/1927 | United Kingdom . |

OTHER PUBLICATIONS

SAE Technical Paper Series No. 840455, Entitled: The Swirl–Chamber Spark Plug: A Means of Faster, More Uniform Energy Conversion in the Spark–Ignition Engine, Dated: Feb. 27, 1984, By: R. Latsch.

Primary Examiner—Tony M. Argenbright
Attorney, Agent, or Firm—J. Wesley Blumenshine

[57] ABSTRACT

A capsule, the interior volume of which is an ignition chamber, is provided with an engine to improve ignition. The capsule has an orifice so the ignition chamber can communicate with a main combustion chamber of the engine. Often, the capsule is connected to a spark plug and the electrode gap of the spark plug is in the ignition chamber. The capsule causes the combustible mixture in the engine to swirl in a controlled manner as it flows from the orifice towards the electrode gap. The interior surfaces of the capsule are contoured such that momentum of the swirling combustible mixture is conserved, thus maintaining the velocity of the swirling combustible mixture as it proceeds from the orifice of the capsule to the electrode gap and also providing an increased velocity of the ignited mixture as it exits the capsule.

11 Claims, 3 Drawing Sheets

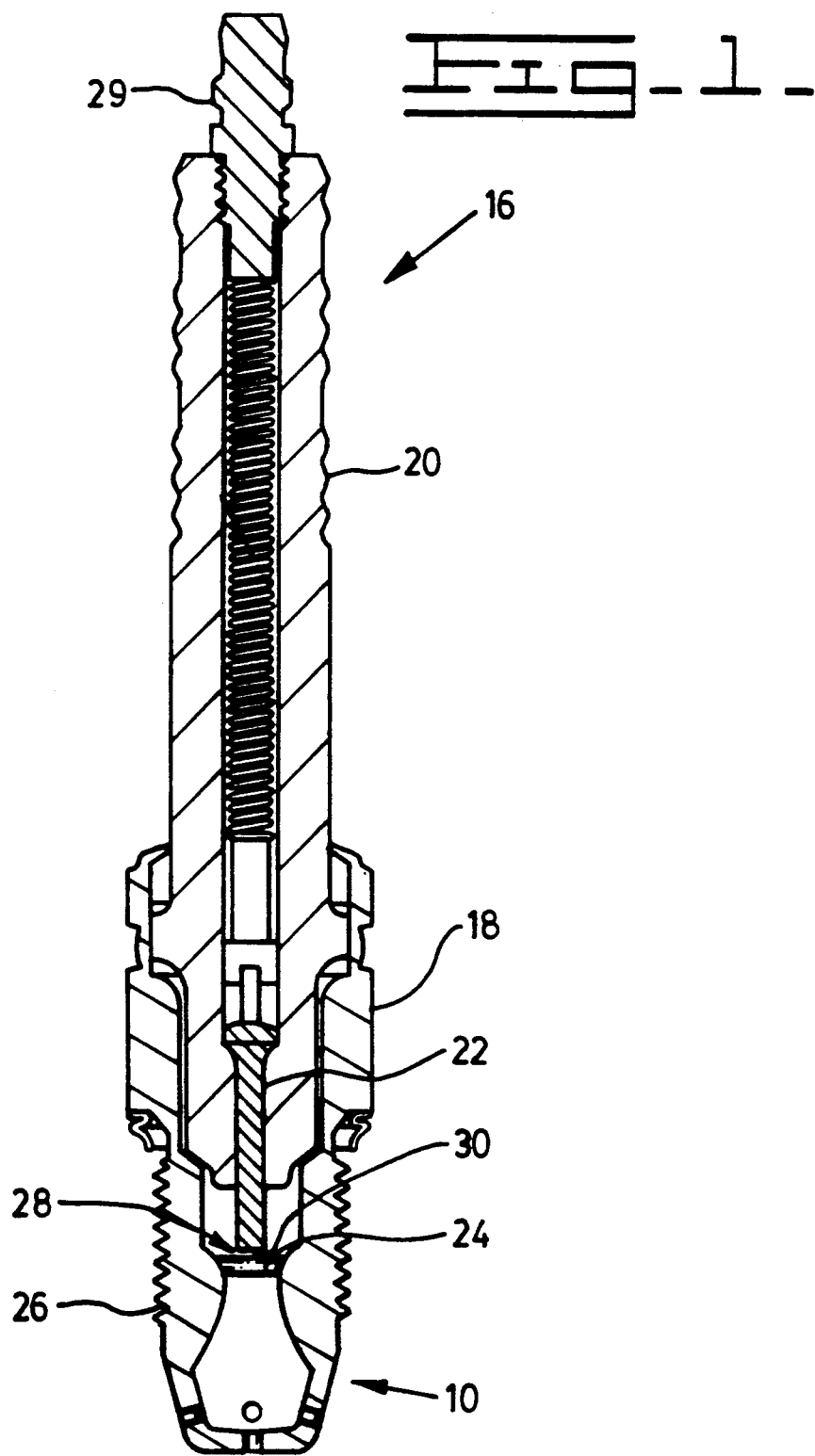

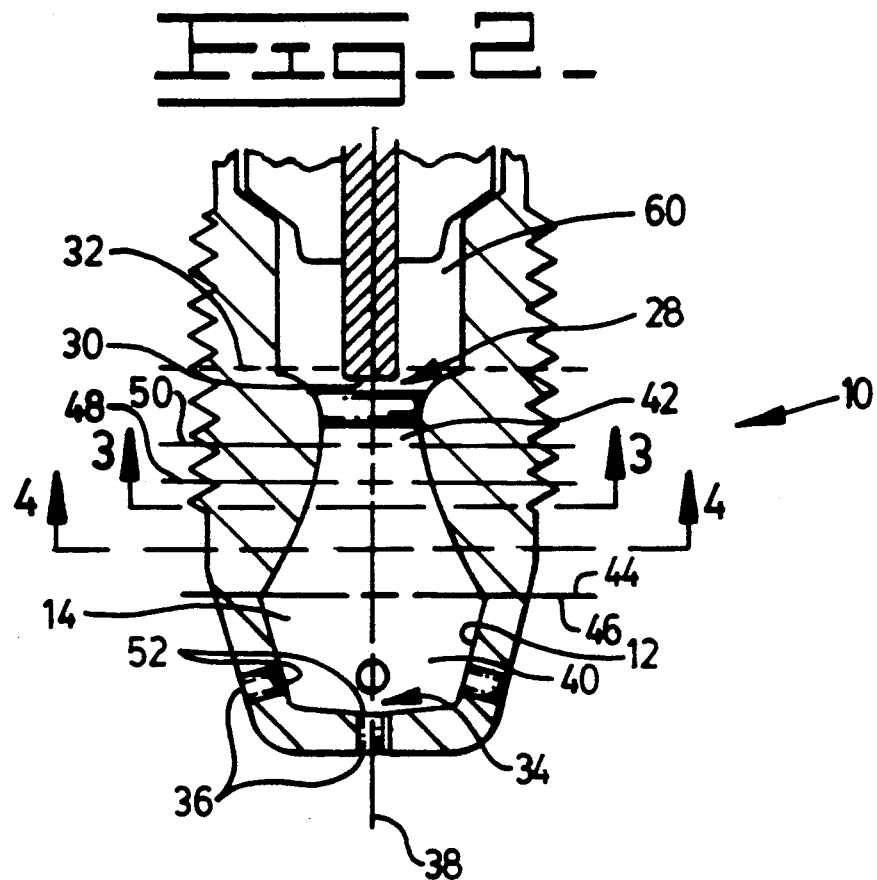
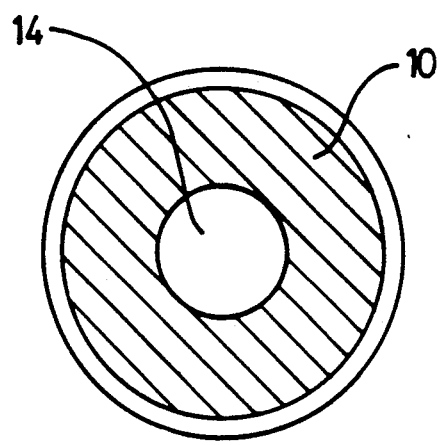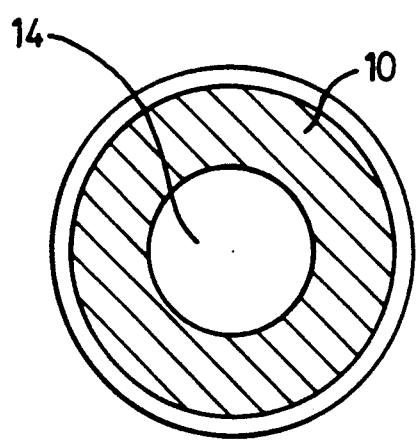

IGNITION ASSISTING DEVICE FOR INTERNAL COMBUSTION ENGINES

DESCRIPTION

1. Technical Field

The present invention is an improvement to devices which assist ignition in an engine. The device is a capsule which is typically connected to a spark plug in such a manner that the electrode gap of the plug is positioned in the interior volume of the capsule, this interior volume being an ignition chamber. The ignition chamber communicates via orifices in the capsule with the main combustion chamber of a piston cylinder. The improvement is the contouring of the interior surfaces of the capsule in such a manner that improved ignition is achieved in the ignition chamber and subsequently in the main combustion chamber of the piston cylinder.

2. Background Art

Orificed capsules which are connected to a spark plug and which encapsulate the electrode gap of the spark plug are well known. Such capsules are intended to provide reliable, uniform, and rapid initiation of combustion and rapid propagation of the flame front into the main combustion chamber of the piston cylinder producing rapid combustion of the main charge. Such capsules have been referred to in the literature as chambers, multi-torch, swirl chambers and others. Spark plugs of this type are disclosed in U.S. Pat. No. 2,127,512, entitled "Spark Plug" which issued to Harper on Aug. 23, 1938; U.S. Pat. No. 2,153,598, entitled "Internal Combustion Engine" which issued to Steward on Apr. 11, 1939; and U.S. Pat. No. 4,513,708, entitled "Method for Igniting Lean Fuel-Air Mixtures and an Apparatus to Perform the Method" which issued to Latsch et al. on Apr. 30, 1985. These capsules typically have tangential and bottom orifices which allow communication between the interior volume of the capsule, this interior volume of the capsule hereafter also referred to as the ignition chamber, and the main combustion chamber of the piston cylinder. The U.S. Pat. Nos. 2,127,512 and 2,153,598 patents disclose spark plugs which can be labelled as center-firing because the electrode gap and consequently the spark is substantially in the center of the ignition chamber. The U.S. Pat. No. 4,513,708 spark plug can be labelled as side-firing because the electrode gap, and consequently the spark, is near the interior surface of the capsule.

The rapidity of ignition of the fuel mixture contained in an internal combustion engine is one of the factors which affects the power output per unit of fuel and also the smoothness of operation. For most satisfactory operation of the engine, the ignition of the entire fuel charge should be as nearly as possible instantaneous. In engines using orificed capsules, during the compression stroke of the piston, the combustible mixture is forced from the main combustion chamber of the piston cylinder through the orifices of the capsule and into the ignition chamber. The orientation of the orifices causes swirling of the mixture in the ignition chamber. This swirling effect of the combustible mixture is an advantage provided by the capsule. The combustible mixture when ignited in the ignition chamber expands and is thereby forcibly ejected through the orifices of the capsule into the main combustion chamber to ignite the main charge. The ignited mixture ejected into the combustion chamber is accelerated during its passage through the orifices and enters the main combustion chamber at high velocities, thereby improving the ignition of the main charge. The jets of flame firing from the multiple orifices of the capsule also increases the turbulence of the gas-air mixture in the main combustion chamber and assure more complete and rapid combustion.

While the capsules of the prior art provided an advantage over engines without such capsules, it was theorized, and later confirmedly tested, that by manipulating the turbulent or swirling action of the combustible mixture within the ignition chamber, yet even more complete and more nearly instantaneous combustion of the combustible mixture in the ignition chamber and subsequently in the main combustion chamber could be achieved.

DISCLOSURE OF THE INVENTION

In one aspect of the present invention, a capsule is provided for assisting ignition in an engine. The capsule may be connected to a spark plug.

The capsule has a top edge, a bottom, interior surfaces and an ignition chamber. The ignition chamber has a centerline, a first plane perpendicular to the centerline, and a second plane perpendicular to the centerline, the second plane being adjacent the first plane and closer to the bottom of the capsule than the first plane, wherein the cross-sectional area of the ignition chamber at the first plane is less than the cross-sectional area of the ignition chamber at the second plane. The ignition chamber is most constricted at or near the electrode gap thereby assuring that a concentrated and very rich combustible mixture will be present at the electrode gap.

The capsule improves ignition by creating a predetermined swirling of the combustible mixture which thus provides a rich region of combustible mixture at the electrode gap. The interior surfaces of the capsule are contoured in such a manner that momentum of the swirling combustible mixture is conserved thus maintaining the velocity of the swirling combustible mixture as it proceeds from the orifices to the electrode gap and also providing an increased velocity of the ignited fuel mixture as it exits the ignition chamber.

BRIEF DESCRIPTION OF THE DRAWINGS

FIG. 1 is a diagrammatic sectional view of a preferred embodiment of a spark plug and capsule taken through the longitudinal centerline;

FIG. 2 is a diagrammatic sectional view of a preferred embodiment of a capsule taken through the longitudinal centerline;

FIG. 3 is a diagrammatic view of the capsule cross-section A—A of FIG. 2.;

FIG. 4 is a diagrammatic view of the capsule cross-section B—B of FIG. 2.;

BEST MODE FOR CARRYING OUT THE INVENTION

Figure 5:
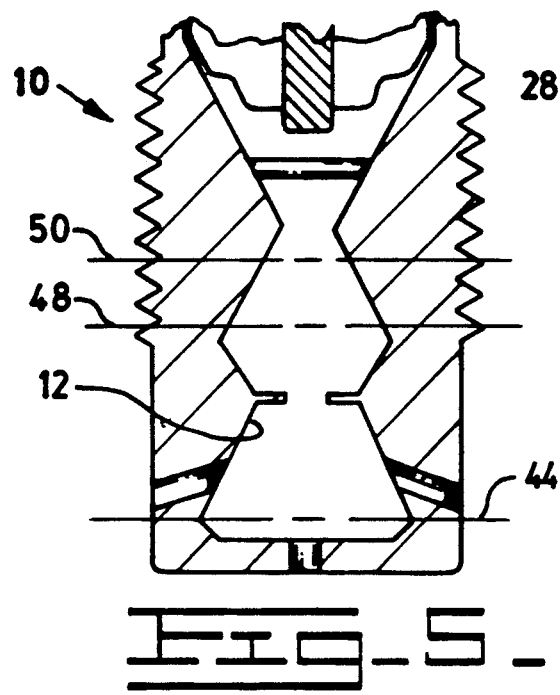
FIG. 5 is a diagrammatic sectional view of another capsule of the present invention taken through the longitudinal centerline.

The present invention is a device for assisting ignition in an engine. The device is a capsule having specially contoured interior surfaces, the interior volume of the capsule being an ignition chamber.

Capsules of the present invention will typically find use in spark ignited engines, although they may also be used in other engines, such as diesel, and they will typically be connected to a 15 spark plug, although they may be connected to other igniters as well.

Referring to FIG. 1, a preferred embodiment of a capsule 10 connected to a spark plug 16 is shown. A preferred spark plug 16 includes a casing 18, an insulator 20, a center electrode 22, and a ground electrode 24. The casing 18 holds and seals against the insulator 20 of the spark plug 16. The casing 18 is provided with a threaded portion 26 to readily screw into a threaded hole in an engine head. The insulator 20 surrounds and holds the center electrode 22 and prevents spark-over from the top 29 of the center electrode 22 to the casing 18. The center electrode 22 and ground electrode 24 are positioned so as to form an electrode gap 28 between them.

Connected to the casing 18 of the spark plug 16 is the capsule 10. As used herein, the term "connected" encompasses configurations whereby the capsule 10 is directly joined to the spark plug 16 and configurations whereby the capsule 10 is indirectly joined to the spark plug 16 by joining the capsule 10 to intermediate members which in turn are joined to the spark plug 16. In the preferred embodiment shown in FIG. 1, the capsule 10 is unitary with the casing 18 of the spark plug 16, meaning the casing 18 and capsule 10 are constructed from the same material and are joined in such a way that they are continuous and undivided elements. In alternative embodiments, the capsule 10 may not be unitary with the casing 18, but may instead be integral with the casing 18, meaning the casing 18 and capsule 10 are separate members constructed from the same or different material and directly or indirectly joined together.

When the spark plug 16 and capsule 10 are connected, the capsule 10 generally is that portion of the assembly adjacent to and below the bottom end 30 of the center electrode 22. Referring now to FIG. 2, a preferred capsule 10 has an ignition chamber 14, a top edge 32, a bottom 34 which is the bottommost point(s) in the ignition chamber 14, interior surfaces 12 extending between the top edge 32 and bottom 34, and an orifice(s) 36 having an opening 52 in the ignition chamber 14. The ignition chamber 14 is defined by the interior surfaces 12 and the bottom 34 of the capsule 10, or, in other words, the ignition chamber 14 is the interior volume of the capsule 10. When connected to a spark plug 16, the ignition chamber 14 also includes any adjacent space above the capsule 10, as shown by reference numeral 60 in FIG. 2. The ignition chamber 14 has a centerline 38, a first end portion 40, which is that portion of the ignition chamber 14 below the plane which is halfway between the top edge 32 and the bottom 34 of the capsule 10, and a second end portion 42, which is that portion of the ignition chamber 14 above the same plane. Generally, the orifice(s) 36 open into the first end portion 40 of the ignition chamber 14 and the electrode gap 28 is at the second end portion 42 of the ignition chamber 14.

The improvement of the present invention is the contouring of the interior surfaces 12 of the capsule 10 in a manner that improves ignition. Capsules 10 of the present invention have interior surfaces 12 contoured in such a manner that when proceeding from the bottom 34 towards the top edge 32 of the capsule 10 along the centerline 38 of the ignition chamber 14, at a first plane 44, which is perpendicular to the centerline 38, the interior surfaces 12 of the capsule 10 begin to converge, meaning the cross-sectional area of the ignition chamber 14 at the first plane 44 is less than the cross-sectional area of the ignition chamber 14 at a second plane 46, the second plane 46 also being perpendicular to the centerline 38 and being adjacent to and immediately preceding the first plane 44 (i.e., the second plane 46 being closer to the bottom 34 of the capsule 10) (because the planes 44 and 46 are infinitesimally close, in the FIGS., number 44 is shown referencing the top of the imaginary plane and number 46 the bottom). Thus, if a cross-section can be found, for exemplary purposes the cross-section 3—3 of FIG. 2, which is shown in FIG. 3, there must exist another cross-section immediately preceding (below) the cross-section 3—3, for exemplary purposes the cross-section 4—4 of FIG. 2, which is shown in FIG. 4, which has a greater cross-sectional area of the ignition chamber 14 than the cross-section 3—3. If all of the cross-sectional areas of the ignition chamber 14 below the cross-section 3—3 are equal, in other words the interior surfaces 12 of the capsule 10 are vertical, or they are of a lesser cross-sectional area, in other words the interior surfaces 12 of the capsule 10 diverge, then the capsule 10 is not of the present invention. If the interior surfaces 12 of the capsule 10 begin converging adjacent the bottom 34 of the capsule 10, then the first plane 44 is adjacent and immediately above the bottom 34 of the capsule 10 and the second plane 46 is at the bottom 34 of the capsule 10. If the interior surfaces are initially vertical or diverge from the bottom 34 of the capsule 10, then the first plane 44 will be located somewhere above the bottom 34 at the plane where the interior surfaces 12 begin to converge.

In the preferred embodiment of the capsule 10 shown in FIGS. 1 and 2, moving from the bottom 34 towards the top edge 32 of the capsule 10 along the centerline 38 of the ignition chamber 14, initially the interior surfaces 12 diverge (i.e., at planes perpendicular to the centerline 38, the cross-sectional area of the ignition chamber 14 increases). However, a short distance above the orifices 36 at the first plane 44 the interior surfaces 12 begin to converge (i.e., the cross-sectional area of the ignition chamber 14 begins decreasing) and the interior surfaces 12 continue to converge until the ignition chamber 14 is most constricted near the electrode gap 28. Above the plane where the ignition chamber is most constricted, the ignition chamber 14 flares back open.

In alternative embodiments, the ignition chamber 14 may not be most constricted adjacent the electrode gap 28 but may instead be most constricted near the electrode gap 28, either above or below the electrode gap 28. It is important, however, that the plane in which the ignition chamber 14 is most constricted not be too far below the electrode gap 28. If the ignition chamber 14 is most constricted at a plane too far below the electrode gap 28, above that plane the swirl of the combustible mixture will increase in diameter and much of the functional advantage of continuously decreasing the diameter of the swirl as it moves towards the electrode gap 28 in order to conserve momentum, increase velocity, and create a rich mixture at the point of ignition, will 10 be lost. Preferably, the ignition chamber 14 will be most constricted above a midway plane 48, the midway plane 48 being a reference plane located halfway between the top edge 32 of the capsule 10 and the first plane 44. More preferably, the ignition chamber 14 will be most constricted above a thirdway plane 50, the thirdway plane 50 being a reference plane located down from the top edge 32 of the capsule 10 one-third the distance from the top edge 32 of the capsule 10 to the first plane 44. Also preferably, the ignition chamber 14 will be most constricted not more than 10 millimeters below the top edge 32, or when connected to a spark plug 16, not more than 10 millimeters below the electrode gap 28, more preferably not more than 7 millimeters below the top edge 32, or when connected to a spark plug 16, not more than 7 millimeters below the electrode gap 28, and most preferably not more than 4 millimeters below the top edge 32, or when connected to a spark plug 16, not more than 4 millimeters below the electrode gap 28. Saying that the ignition chamber 14 is most constricted not more than a specific distance below the top edge 32 or electrode gap 28 is in no way to be understood t exclude the ignition chamber 14 from being most constricted adjacent to or above the top edge 32 or the electrode gap 28.

Figure 6:
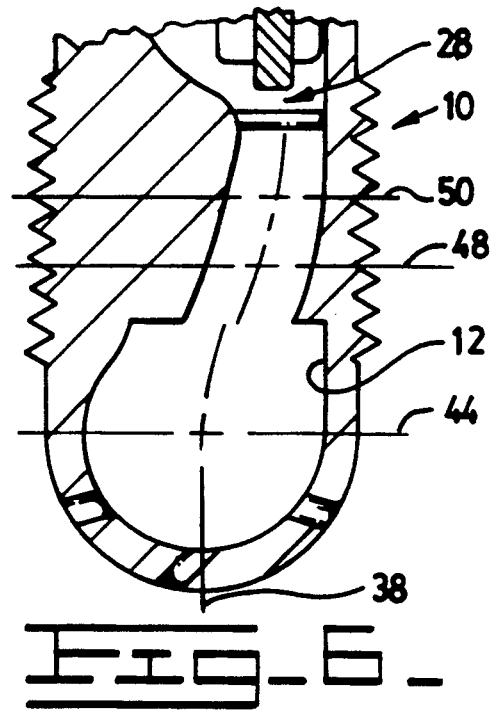
FIG. 6 is a diagrammatic sectional view of yet another capsule of the present invention taken through the longitudinal centerline.

Other embodiments of capsules 10 of the present invention are diagrammatically depicted in FIGS. 5 and 6. These capsules 10 are of the present invention because at the first plane 44 the interior surfaces 12 of the capsule 10 begin to converge. Further, the ignition chambers 14 of these capsules 10 are most constricted near the electrode gap 28 of the spark plug 16 and above the midway plane 48 and the thirdway plane 50.

Figure 7:
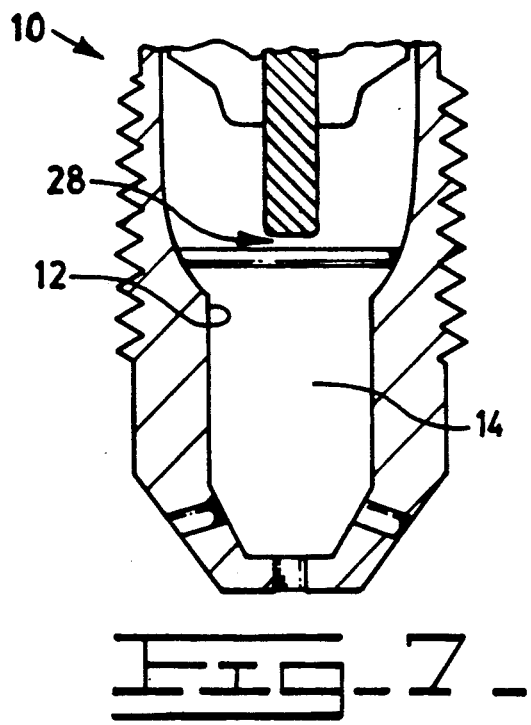
FIG. 7 is a diagrammatic sectional view of a capsule which is *not* of the present invention taken through the longitudinal centerline.
Figure 8:
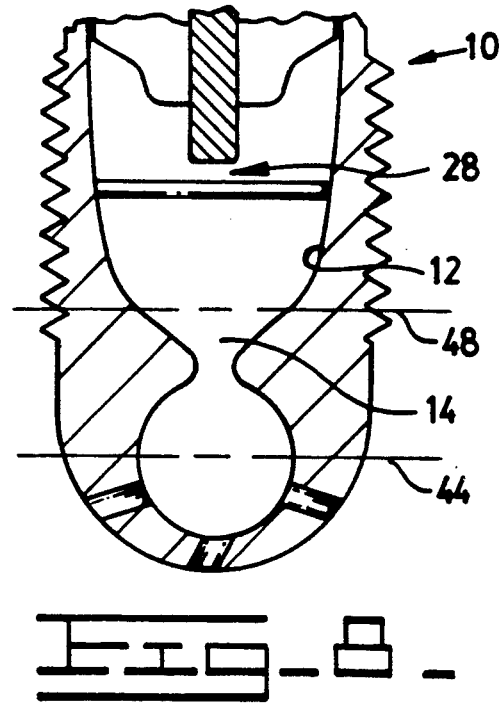
FIG. 8 is a diagrammatic sectional view of another capsule which is not of the present invention taken through the longitudinal centerline.

Oppositely, FIGS. 7 and 8 diagrammatically depict capsules 10 which are not of the present invention because in FIG. 7 the interior surfaces 12 of the capsule 10 never converge and in FIG. 8 the ignition chamber 14 is most constricted too far below the electrode gap 28.

In alternative embodiments of the present invention, the interior surfaces 12 may not converge steadily or they may not converge curvilinearly. As shown in FIG. 6, the interior surfaces 12 may initially diverge, then converge, then diverge, then converge again and the interior surfaces 12 may be straight-line. Any such combinations which improve ignition as herein described are of the present invention.

In a preferred embodiment of the capsule 10, as shown in FIG. 2, the capsule 10 is made of nickel. The capsule 10 is 22 millimeters high and has an outside diameter of 16 millimeters. The capsule 10 has a thickness at the bottom of 2 millimeters. The diameter of the ignition chamber 14 at the cross-section 3—3 is 8 millimeters. The interior surfaces 12 of the capsule 10 converge along a parabolic path. The interior surfaces 12 of the capsule 10 could alternatively converge along a straight-line, hyperbolic or numerous other paths. Preferably, the space 60 above the capsule 10, is at least twenty percent of the space of the ignition chamber 14. The ground electrode 24 is made of platinum and extends laterally across the ignition chamber 14 through the centerline 38 and is welded to the interior surfaces 12 of the capsule 10. It has a square cross-section having a thickness of 1.5 millimeters. The center electrode 22 is made of iridium and has a diameter of 3.5 millimeters. The capsule 10 has an orifice system comprised of four side orifices 36 and one bottom orifice 36. The orifices 36 have a circular cross-section having a diameter of 1.5 millimeters. The side orifices 36 are equally spaced around the circumference of the capsule 10, are tangential to the longitudinal centerline 38, and are angled upward from the outside to the inside of the capsule 10 at about 16 degrees. The side orifices 36 are parallel to and offset about 2.36 millimeters from the end view coordinate axes.

In the embodiments shown in FIGS. 1 through 5, the centerline 38 of the ignition chamber 14 is continuous vertical. In other embodiments, for instance the embodiment shown in FIG. 6, the centerline 38 of the ignition chamber 14 may be discontinuous and/or curvilinear.

In a preferred embodiment, the capsule 10 and the ignition chamber 14 have circular lateral cross-sections. However, in alternative embodiments, the capsule 10 or ignition chamber 14 could have oblong, octagonal, non-symmetrical, etc. cross-sections and such alternative embodiments are intended to be covered by the specification and claims herein.

Industrial Applicability

The capsule 10 of the present invention is primarily intended for use in spark ignited engines, although it could find use as an ignition chamber 14 in other engines, such as diesel.

In a spark ignited engine, during the upstroke of the piston, a combustible mixture is introduced into the main combustion chamber of a piston cylinder. As the mixture is compressed, it is forced through the orifices 36 of the capsule 10 into the ignition chamber 14. The orientation of the side orifices 36 creates an upward swirling effect of the combustible mixture in the ignition chamber 14.

Assuming the combustible mixture consists of molecules of different weight, the heavier molecules are centrifuged to the outside of the swirl against the interior surfaces 12 of the capsule 10 while the lighter molecules are at the inside of the swirl. Depending upon the combustible mixture, there will be a rich region either at the outside of the swirl at the interior surfaces 12 of the capsule 10 (for example, gasoline) or at the inside of the swirl at the centerline 38 of the ignition chamber 14 (for example, methane). Depending on the combustible mixture to be used, the electrode gap 28 can be positioned so as to be side-firing or center-firing, as previously described, so as to take advantage of the rich region.

In capsules having vertical interior surfaces 12 or interior surfaces 12 which diverge, as the swirl of combustible mixture moves upward from the orifices 36 towards the electrode gap 28, there is a loss of momentum and a decrease in the velocity of the swirl. Thus, the heavier and lighter molecules are not as well separated as they otherwise might be and therefore the rich region is not as rich as it otherwise might be.

An advantage of contouring the inside surfaces of the capsule 10 as described herein is to conserve the momentum and maintain the velocity of the combustible mixture from the time it enters the ignition chamber 14 up to the electrode gap 28. In this way, the rich region is made richer than it otherwise might be.

When an electric charge is introduced in any conventional manner to the top 29 of the center electrode 22, a spark is created at the electrode gap 28. The spark ignites the combustible mixture in the ignition chamber 14. The ignited mixture expands forcing flames back through the orifices 36, 37. These jets of flame ignite the combustible mixture in the main combustion chamber.

Expansion of this ignited mixture forces the piston down.

The flared open portion of the ignition chamber 14 above the electrode gap 28 provides a space into which remnant combusted or non-combusted mixture may be displaced so as not to impede the upward flow of the next charge of incoming combustible mixture.

I claim:

1. A capsule for assisting ignition of a combustible mixture in an engine, said capsule comprising:
    a top edge;
    interior surface which converge;
    an ignition chamber having a centerline and a first plane perpendicular to said centerline whereat said interior surfaces begin to converge; and
    a side orifice oriented to cause said combustible mixture to swirl as said combustible mixture enters said ignition chamber via said side orifice;
    wherein said interior surfaces converge over a length of said centerline significant enough to conserve substantially the momentum of said swirling combustible mixture from the time and combustible mixture enters said ignition chamber via said side orifice to the time said combustible mixture is ignited, and above said first plane said ignition chamber is mot constricted not more than 10 millimeters below said to pledge of said capsule.

2. The capsule as set forth in claim 1, wherein above said first plane said ignition chamber is most constricted not more than 7 millimeters below said top edge of said capsule.

3. The capsule as set forth in claim 2, wherein said capsule is connected to a spark plug, said spark plug having an electrode gap, said electrode gap being within said ignition chamber above said first plane.

4. A capsule for assisting ignition of a combustible mixture in an engine, said capsule comprising:
    a top edge;
    interior surfaces which converge;
    an ignition chamber having a centerline, a first plane perpendicular to said centerline whereat said interior surfaces begin to converge, and a midway plane perpendicular to said centerline halfway between said top edge and said first plane; and
    a side orifice oriented to cause said combustible mixture to swirl as said combustible mixture enters said ignition chamber via said side orifice;
    wherein said interior surfaces converge over a length of said centerline significant enough to conserve substantially the momentum of said swirling combustible mixture from the time said combustible mixture enters said ignition chamber via said side orifice to the time said combustible mixture is ignited, and above said first plane said ignition chamber is most constricted above said midway plane.

5. The capsule as set forth in claim 4, further comprising a thirdway plane perpendicular to said centerline and located down from said top edge of said capsule one-third the distance from said top edge to said first plane, wherein above said first plane said ignition chamber is most constricted above said thirdway plane.

6. A capsule for assisting ignition of a combustible mixture in an engine, said capsule comprising:
    interior surfaces which converge;
    an ignition chamber having a centerline and a first plane perpendicular to said centerline whereat said interior surfaces being to converge; and
    a side orifice oriented to cause said combustible mixture to swirl as said combustible mixture enters said ignition camber via said side orifice;
    wherein said interior surfaces converge over a length of said centerline significant enough to conserve substantially the momentum of said swirling combustible mixture from the time said combustible mixture enters said ignition chamber via said side orifice to the time said combustible mixture is ignited, and above said first plane said ignition chamber is most constricted not more than 10 millimeters below said electrode gap of said spark plug.

7. The capsule as set forth in claim 6, wherein above said first plane said ignition chamber is most constricted not more than 7 millimeters below said electrode gap.

8. The capsule as set forth in claim 1, 4, or 6, wherein from said bottom of said capsule said interior surfaces initially diverge.

9. The capsule as set forth in claim 1, 4, or 6, wherein from said bottom of said capsule said interior surfaces initially are vertical.

10. The capsule as set forth in claim 1, 4, or 6, said ignition chamber further comprising a first end portion and a second end portion, said orifice opening being in said first end portion.

11. The capsule as set forth in claim 10, wherein said first plane is above said orifice opening.

* * * * *

UNITED STATES PATENT AND TRADEMARK OFFICE
CERTIFICATE OF CORRECTION

PATENT NO. : 5,105,780

DATED : April 21, 1992

INVENTOR(S) : Ronald D. Richardson

It is certified that error appears in the above-identified patent and that said Letters Patent is hereby corrected as shown below:

Claim 1, column 7, line 12, "surface" should be --surfaces--.

Claim 1, column 7, line 22, "and" should be --said--.

Claim 1, column 7, line 26, "mot" should be --most--.

Claim 1, column 7, line 27, "to pledge" should be --top edge--.

Claim 8, column 8, line 36, "claim" should be --claims--.

Claim 9, column 8, line 39, "claim" should be --claims--.

Claim 10, column 8, line 42, "claim" should be --claims--.

Signed and Sealed this

Twenty-second Day of June, 1993

Attest:

MICHAEL K. KIRK

*Attesting Officer*     *Acting Commissioner of Patents and Trademarks*